United States Patent
Jones, Jr. et al.

(10) Patent No.: US 8,733,013 B1
(45) Date of Patent: May 27, 2014

(54) FLEXIBLE FISHING LURE WITH RODS AS BUBBLE RELEASING MECHANISM

(71) Applicants: Nyles Kelley Jones, Jr., Deer Park, TX (US); Nyles Kelley Jones, Sr., La Porte, TX (US)

(72) Inventors: Nyles Kelley Jones, Jr., Deer Park, TX (US); Nyles Kelley Jones, Sr., La Porte, TX (US)

( * ) Notice: Subject to any disclaimer, the term of this patent is extended or adjusted under 35 U.S.C. 154(b) by 0 days.

(21) Appl. No.: 13/870,470

(22) Filed: Apr. 25, 2013

(51) Int. Cl.
*A01K 85/00* (2006.01)
*A01K 85/01* (2006.01)

(52) U.S. Cl.
USPC ........ 43/42.24; 43/42.26; 43/42.31; 43/42.06

(58) Field of Classification Search
USPC ............. 43/42.24, 42.26, 42.28, 42.06, 42.31
See application file for complete search history.

(56) References Cited

U.S. PATENT DOCUMENTS

| | | | | |
|---|---|---|---|---|
| 1,359,618 | A | * | 11/1920 | Oliver et al. ............... 43/42.15 |
| 1,961,539 | A | * | 6/1934 | White ....................... 43/42.06 |
| 2,117,206 | A | * | 5/1938 | Neff ............................ 43/17.6 |
| 2,290,433 | A | * | 7/1942 | Jeffers ...................... 43/42.26 |
| 2,523,536 | A | | 1/1948 | Maddux |
| 2,765,572 | A | * | 10/1956 | Woolfe ..................... 43/42.06 |
| 2,775,839 | A | | 1/1957 | Kuslich |
| 2,869,279 | A | * | 1/1959 | Pretorius ................... 43/42.06 |
| 3,047,975 | A | * | 8/1962 | Pretorius ................... 43/42.06 |
| 3,108,389 | A | * | 10/1963 | McGuire ................... 43/42.06 |
| 3,122,853 | A | * | 3/1964 | Koonz et al. .............. 43/42.24 |
| 3,490,165 | A | * | 1/1970 | Thomassin ................ 43/42.24 |
| 3,585,749 | A | | 6/1971 | Dieckmann |
| 3,621,600 | A | * | 11/1971 | Dworski .................... 43/42.06 |
| 3,835,572 | A | * | 9/1974 | Mounsey ................... 43/42.06 |
| 3,983,656 | A | * | 10/1976 | Bain .......................... 43/42.24 |
| 4,069,610 | A | * | 1/1978 | Firmin ....................... 43/42.24 |
| 4,074,455 | A | * | 2/1978 | Williams, Jr. .............. 43/42.06 |
| 4,098,017 | A | * | 7/1978 | Hall ........................... 43/42.06 |
| 4,197,667 | A | * | 4/1980 | Helfenstine et al. ....... 43/42.06 |
| 4,312,148 | A | * | 1/1982 | Hardwicke, III .......... 43/42.24 |
| 4,771,564 | A | | 9/1988 | Whitley |
| 4,790,100 | A | * | 12/1988 | Green, Sr. .................. 43/42.26 |
| 4,888,905 | A | * | 12/1989 | Garr .......................... 43/42.06 |
| 4,914,850 | A | * | 4/1990 | Rice .......................... 43/42.24 |
| 5,167,088 | A | | 12/1992 | Wardall |
| 5,276,992 | A | * | 1/1994 | Kato .......................... 43/42.06 |
| 5,471,780 | A | * | 12/1995 | Hopson ..................... 43/42.06 |
| 5,494,432 | A | * | 2/1996 | Coggins et al. ............ 43/42.24 |

(Continued)

FOREIGN PATENT DOCUMENTS

| | | | | | |
|---|---|---|---|---|---|
| GB | 2211057 | A | * | 6/1989 | ............ A01K 85/00 |
| GB | 2398471 | A | * | 8/2004 | ............ A01K 85/00 |

(Continued)

*Primary Examiner* — Darren W Ark
(74) *Attorney, Agent, or Firm* — Buskop Law Group, PC; Wendy Buskop

(57) ABSTRACT

A flexible fishing lure for use with a fishing rod, line and hook, by virtue of which the lure can be attached via the line to the fishing rod and used in casting wherein the lure uses a soft, elastic material, comprising a body, a first end, a second end, a plurality of rods extending perpendicularly outwardly from a body outer surface with a rod density of from 10 to 70 rods per inch along the body and upon casting the fishing lure, the rods vibrate creating simulated movement as the fishing lure sinks or is drawn through the water, creating simultaneously a life-like appearance with life-like vibrations. The fishing lure with rods can have air containing cavities for creating a visual attraction simultaneously with the life-like appearance and life-like vibrations.

11 Claims, 2 Drawing Sheets

(56) References Cited

U.S. PATENT DOCUMENTS

| | | | |
|---|---|---|---|
| 5,517,781 A * | 5/1996 | Paoletta, Jr. | 43/42.06 |
| 5,625,975 A | 5/1997 | Imes | |
| 5,893,231 A * | 4/1999 | Kato | 43/42.24 |
| 5,894,692 A * | 4/1999 | Firmin | 43/42.24 |
| 5,934,008 A * | 8/1999 | Rice | 43/42.26 |
| 6,041,540 A | 3/2000 | Potts | |
| 6,094,855 A * | 8/2000 | Stump | 43/42.24 |
| 6,115,956 A * | 9/2000 | Firmin | 43/42.06 |
| D434,100 S * | 11/2000 | Loy | D22/127 |
| 6,173,523 B1 * | 1/2001 | Johnson | 43/42.24 |
| 6,266,916 B1 * | 7/2001 | Dugan | 43/42.06 |
| 6,408,567 B1 * | 6/2002 | Clark | 43/42.53 |
| 6,678,992 B1 * | 1/2004 | Clark | 43/42.06 |
| 6,775,944 B1 * | 8/2004 | Jones, Jr. | 43/42.24 |
| 6,843,016 B1 * | 1/2005 | Jones, Jr. | 43/42.26 |
| 6,912,808 B1 * | 7/2005 | Mak | 43/42.28 |
| 6,948,695 B1 * | 9/2005 | Clark | 43/42.53 |
| 7,484,327 B2 * | 2/2009 | Moore | 43/42.28 |
| 7,992,343 B1 * | 8/2011 | Jones et al. | 43/42.24 |
| 7,998,394 B1 * | 8/2011 | Jones et al. | 264/319 |
| 2003/0192227 A1 * | 10/2003 | Stava et al. | 43/42.24 |
| 2009/0277071 A1 * | 11/2009 | Harris, Jr. | 43/42.24 |
| 2013/0031822 A1 * | 2/2013 | Reeves et al. | 43/42.06 |

FOREIGN PATENT DOCUMENTS

| | | | | |
|---|---|---|---|---|
| JP | 02060537 A * | 3/1990 | | A01K 85/01 |
| JP | 05284883 A * | 11/1993 | | A01K 85/01 |
| JP | 06311832 A * | 11/1994 | | A01K 85/00 |
| JP | 2000342115 A * | 12/2000 | | A01K 85/00 |
| JP | 2002000131 A * | 1/2002 | | A01K 85/01 |
| JP | 2002027871 A * | 1/2002 | | A01K 85/01 |
| JP | 2002306025 A * | 10/2002 | | A01K 85/00 |
| JP | 2008113612 A * | 5/2008 | | A01K 85/01 |
| WO | WO 9808378 A1 * | 3/1998 | | A01K 85/00 |

* cited by examiner

FLEXIBLE FISHING LURE WITH RODS AS BUBBLE RELEASING MECHANISM

FIELD

The present embodiments generally relate to a flexible fishing lure.

BACKGROUND

A need exists for a flexible fishing lure that can appear to be a live worm or aquatic animal, while floating or sinking in a body of water, through the use of rods and optionally, through use of air bubbles from tapped spaces along the body to create simultaneously a lifelike movement and an attraction in the water.

A lure is needed that provides simulated movement and vibration in the water, and optionally provides a non-sequential release of bubbles as an attraction along the body simultaneously with a realistic life-like movement in the water.

The present embodiments meet these needs.

BRIEF DESCRIPTION OF THE DRAWINGS

The detailed description will be better understood in conjunction with the accompanying drawings as follows.

Figure 1A:
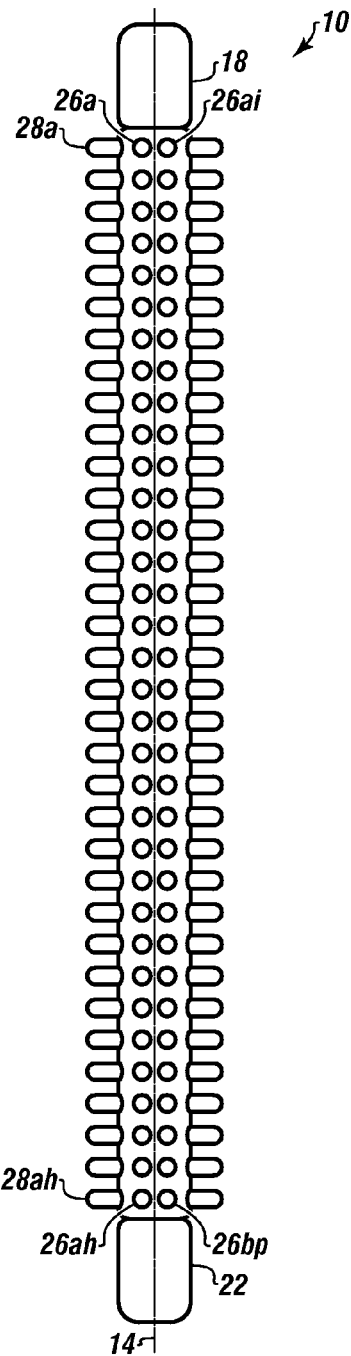
FIG. 1A is a side perspective view of the worm type aquatic fishing lure.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to a flexible fishing lure for use with a fishing rod, line and hook, by virtue of which the lure can be attached via the line to the fishing rod and used in casting.

The flexible fishing lure can be a worm type aquatic fishing lure or an animal type aquatic fishing lure made from a soft, elastic material.

The worm type aquatic fishing lure can have a body, a first end with a first end diameter, a second end with a second end diameter, and a plurality of rods extending perpendicularly outwardly from a body outer surface with a rod density of 10 rods to 70 rods per inch. The rods can be both solid and flexible.

When casting, the rods can vibrate creating simulated movement as the lure sinks or is drawn through the water, creating simultaneously a life-like appearance with life-like vibrations.

Additionally, in embodiments, the flexible fishing lure with rods can have air containing and releasing cavities formed in the body for creating a visual attraction simultaneously with the life-like appearance and life-like vibrations created using the plurality of rods.

In embodiments, the rods can be solid. In other embodiments the rods can be hollow or partially hollow. In embodiments the rods can contain air trapping and releasing cavities.

In one or more embodiments, the flexible fishing lure can be about 3 inches to about 12 inches long.

In one or more embodiments, the flexible fishing lure can have a body with rods extending from the body, a first end without rods, and a second end opposite the first end without rods.

In one or more embodiments, the animal type aquatic fishing lure can have a body with rods, a tail without rods, and a head without rods.

In embodiments, a plurality of air trapping and releasing cavities in the body can allow bubbles to non-sequentially bubble between and to the rods, sticking to the rods as the air releases, creating a visual attraction in the water simultaneously with a realistic worm or realistic aquatic animal movement and realistic, life-like vibrations.

The body of the flexible fishing lure can have a first end and a second end. In embodiments, the ends of the body can be hollow, the ends of the body can be solid, or one end of the body can be solid while the other end of the body can be hollow.

In embodiments, each of the plurality of solid rods can have a diameter from 0.070 inches to 0.150 inches.

In embodiments, air trapping and releasing cavities can be used in the flexible fishing lure, and a plurality of air trapping and releasing cavities can be formed longitudinally along the longitudinal axis of the body of the flexible fishing lure.

The air trapping and releasing cavities can be positioned adjacent to each other, in lines or rows, along the longitudinal central axis for trapping and retaining air prior to positioning the lure in a body of water. The air trapping and releasing cavities can trap air before casting, and then in the water, the air trapping and releasing cavities can slowly release air bubbles during movement of the lure in water.

The worm type aquatic fishing lure can have a body with a first end and a second end into which a hook can be inserted.

The animal type aquatic fishing lure can have a body with a head and a tail, a back side and a stomach side, and the hook can be inserted in the head, in the tail, or even through the body.

The flexible fishing lure can be made of a soft elastic material that is an elastomeric polymer, a polyvinyl chloride, a blend consisting of polyvinyl polymer and an elastomer, or a biodegradable plastic material.

The biodegradable plastic material can be a plastic polymer, such as a biodegradable polyester known as ENVIRON™ available from Kaysons of Mumbai, India.

The flexible fishing lure can be made of a soft elastic material that is a blend of elastomer and clear polypropylene, a polyethylene, a urethane, combinations thereof, or any other polymer capable of creating a flexible fishing lure that is biodegradable and provides movement when pulled through water.

In an embodiment, the body can be partially hollow, such as 50 percent hollow.

In embodiments, the air trapping and releasing cavities can be disposed along any length of the body, such as the entire length of the body.

Each air trapping and releasing cavity can be a hole having a depth from 0.1 millimeters to 0.5 millimeters and a diameter of 0.25 millimeters to 0.4 millimeters.

The density of the air trapping and releasing cavities can be from 1 per inch to 10 per inch along the body.

In an embodiment, the worm type aquatic fishing lure, can be 4 inches long with a total of 136 rods and 4 air trapping and releasing cavities. The rod density can be about 30 per inch.

In another embodiment, the worm type aquatic fishing lure can have a total of 272 rods and 8 releasing cavities. The rod density can be about 42 per inch.

In other embodiments, the body and one of the ends can be partially hollow or solid in places wherein the air trapping and releasing cavities are not formed.

Air trapping and releasing cavities can be formed in the body during the molding process of the lure. The mold can have a plurality of small extensions around which liquid polymer is poured and then the polymer solidifies forming the air trapping and releasing cavities when the flexible fishing lure is pulled off the mold.

The air trapping and releasing cavities can be formed at right angles or at a sloped angle to the longitudinal central axis of the flexible fishing lure.

The air trapping and releasing cavities can extend through 20 percent to 75 percent of the diameter of the body, though not through the entire diameter of the body.

In an embodiment, the air trapping and releasing cavities can be angled. The cavities can be angled into the body at a slope from about 60 degrees to about 40 degrees from the longitudinal axis of the flexible fishing lure.

The air trapping and releasing cavities can be formed sufficiently deep to trap small amounts of air while the elasticity of the soft elastic material, such as the polypropylene polymer can partially close off the air trapping and releasing cavities at the edge of the body, creating an intake for the air and a closed off portion to contain the air simultaneously.

Air can bubble out of the air trapping and releasing cavities when the flexible fishing lure is moved or swished in the water, or comes in contact with a stump or stone or structure in the water, causing uneven air release from the air trapping and releasing cavities creating groups of bubbles that move or flow up along the rods, or between the rods, in sequence, extending from the body of the flexible fishing lure.

In embodiments, the worm type aquatic fishing lure can be coated or injected with a member of the group: flavor, such as garlic or hamburger flavor, a scent such as blood or blueberries, or combinations thereof.

In embodiments, the soft elastic material can further comprise a member of the group: glitter, such as silver sparkles; a pigment, such as a red pigment; and combinations thereof.

Combinations of scent, flavor, colors and sparkles can be used in the soft plastic material.

The embodiments include an animal type aquatic fishing lure for use with a fishing rod, line and hook, by virtue of which the lure can be attached via the line to the fishing rod and used in casting, which is made from a soft, elastic material, having a body with a head, and a tail opposite the head, a stomach side and a back side.

The animal type aquatic fishing lure can have a plurality of rods that are formed in the soft elastic material from the soft elastic material and extend outwardly from the back side. The rods can extend perpendicularly or at an angle from the back side.

Each rod can have a rod length that is 10 percent to 100 percent the length of the body diameter. In embodiments the rods can be partially hollow creating air trapping and releasing cavities in the rods in addition to the air trapping and releasing cavities in the body.

In an embodiment, the flexible fishing lure can have rods with air trapping and releasing cavities and a body without air trapping and releasing cavities.

The animal body back side supports the plurality of rods with a rod density of from 10 rods to 70 rods per inch along the animal body.

Upon casting the animal type aquatic fishing lure into water, the rods can vibrate creating simulated movement as the animal type aquatic fishing lure sinks or is drawn through the water, creating simultaneously a life-like appearance with life-like vibrations. When the bubbles are released from the air trapping cavities, and attraction is simultaneously formed.

The animal type aquatic fishing lure can be shaped like a lizard, snake, creature bait, or a swimming animal. A creature bait can be a fictional creature having a head, a body and a tail. A crawfish type creature can be one that does not actually exist in nature, but suggests or resembles a crawfish. A swimming animal can be a shad, herring, shrimp, or other fry fish shapes.

The animal type aquatic fishing lure can have a ribbon tail or a paddle tail.

The term "ribbon tail" as used herein, refers to a tail that can be longer than the body, and can be thinner than the thickness of the body.

The term "paddle tail" as used herein, refers to a tail that is thin where it attaches to the body, then becomes wider and paddle shaped, which can then taper after the paddle portion in embodiments.

The plurality of rods can be spaced equidistantly from the back side, the stomach side, or combinations thereof.

The plurality of rods can be formed in clusters, in lines or combinations thereof on the animal body back side, animal body stomach side, or combinations thereof.

The animal type aquatic fishing lure can include a plurality of air trapping and releasing cavities formed in the animal body.

In an embodiment, the air trapping and releasing cavities can be formed through 20 percent to 75 percent of the diameter of the animal body, though not through the entire diameter of the animal body.

The air trapping and releasing cavities can be formed in the rods along a longitudinal axis of the rods in an embodiment, formed away from the body.

The air trapping and releasing cavities can have a density of 1 per inch to 10 per inch along the animal body. Each air trapping and releasing cavity can be sufficiently deep to trap small amounts of air while the lure is out of the water, and have the advantage that the elasticity of the soft elastic material can partially close off the air trapping and releasing cavities at edges of the air trapping and releasing cavities, creating a closed off portion to contain the collect air.

Upon casting the lure into water, the rods can vibrate creating simulated movement and simultaneously air bubbles can be non-sequentially released from the air trapping and releasing cavities as the animal type aquatic fishing lure swishes in the water, sinks or is otherwise drawn through the water, creating both a visual attraction in the water with the bubbles while simultaneously creating a life-like appearance and life-like vibrations with the rods.

Turning now to the Figures, FIG. 1A is a side perspective view of the worm type aquatic fishing lure with rods and air trapping and releasing cavities.

The body 10 can have a body longitudinal axis 14, a first end 18 and a second end 22.

In this embodiment, the body can have a length of 6.250 inches and a body diameter of 0.650 inches.

The body outer surface can be penetrated by a plurality of air trapping and releasing cavities 26a-26ah in a first row and a plurality of air trapping and releasing cavities 26ai-26bp in a second row.

The body can be formed from polyvinyl chloride with garlic embedded in the polymer.

The body can have a plurality of rods 28a-28ah extending from the body outer surface.

In this embodiment, approximately 278 rods are formed on the outer body surface of the entire worm type aquatic fishing lure.

In an embodiment, the rods can be 0.150 inches in length and each rod can have a diameter of 0.0940 inches.

Figure 1B:
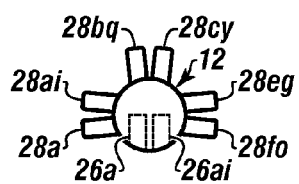
FIG. 1B is an end view of the worm type aquatic fishing lure of FIG. 1A.

FIG. 1B is an end view of the flexible fishing lure of FIG. 1A.

In this view, rods 28a, 28ai, 28bq, 28cy, 28eg, 28fo are depicted.

A body outer surface 12 is shown and the plurality of air trapping and releasing cavities 26a and 26ai are also shown in the body.

Figure 2A:
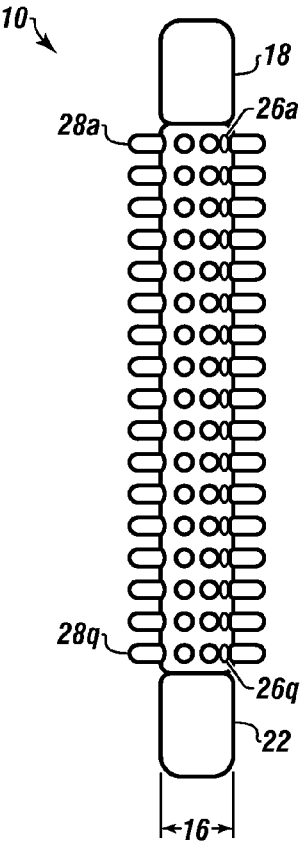
FIG. 2A depicts another embodiment of the worm type aquatic fishing lure.

FIG. 2A is a side view of another embodiment of the worm type aquatic fishing lure with the plurality of rods 28a to 28q formed in the body 10.

The body 10 is shown with the first end 18 and the second end 22. The body can have a body diameter 16.

In embodiments, a single row of the plurality of air trapping and releasing cavities 26a-26q can be used.

The embodiment of the flexible fishing lure in this FIG. 2A can have an overall length of 3.750 inches. This flexible fishing lure can have a body diameter of 0.350 inches.

In this embodiment of the flexible fishing lure, each rod can be 0.150 inch in length and each rod can have a diameter of 0.0924 inches.

Figure 2B:
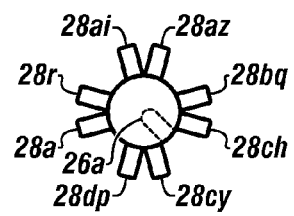
FIG. 2B is an end view of the worm type aquatic fishing lure of FIG. 2A.

FIG. 2B is an end view of the flexible fishing lure of FIG. 2A.

The plurality of rods 28a, 28r, 28ai, 28az, 28bq, 28ch, 28cy and 28dp are shown. In this embodiment, each rod can have a rod length of 0.150 inches. Each rod can have a diameter of 0.094 inches.

A single air trapping and releasing cavity 26a is shown.

Figure 3A:
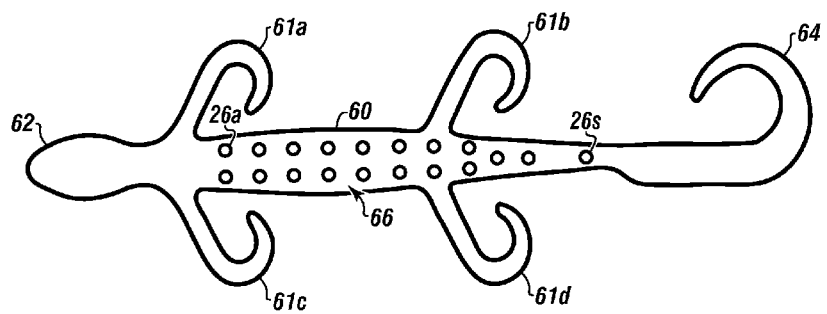
FIG. 3A is a bottom view of an embodiment of the animal type aquatic fishing lure.

FIG. 3A is a bottom view of an embodiment of an animal type aquatic fishing lure. The animal type aquatic fishing lure can have a head, a body, legs, feet, or combinations thereof.

Figure 3B:
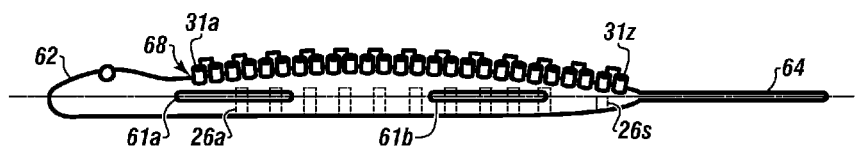
FIG. 3B is a side view of another embodiment of the animal type aquatic fishing lure.

FIG. 3B is a side view of the animal type aquatic fishing lure.

Figure 3C:
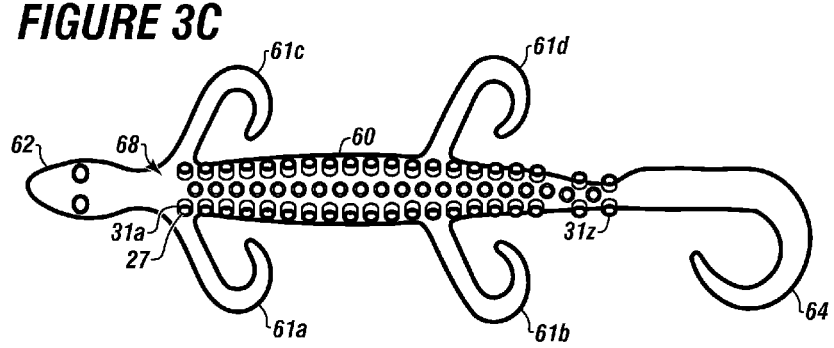
FIG. 3C is a top view of another embodiment of the animal type aquatic fishing lure providing a detail view of the partially hollow rods.

FIG. 3C is a top view of the animal type aquatic fishing lure providing a detail view the partially hollow rods.

The animal type aquatic fishing lure can have a body 60, a head 62 and a tail 64. In FIG. 3A the stomach side 66 is shown along with legs 61a, 61b, 61c and 61d connected to the body.

In embodiments, the head 62 can be larger or smaller than the body. In embodiments, the tail 64 can have a variety of shapes.

The head and body together can have an overall size less than, equal to, or greater than the tail.

In an embodiment, the head can have a ¼ inch thickness and the body can have a ¾ inch thickness. In another embodiment, the head can have a ¾ inch diameter and the body can have a ¼ inch diameter. In still another embodiment, the head can have a ½ inch diameter and the body can have a ½ inch diameter.

The animal type aquatic fishing lure can have a plurality of air trapping and releasing cavities 26a-26s for receiving air through the stomach side.

FIG. 3B shows a side view of the animal type aquatic fishing lure with a plurality of partially hollow rods 31a-31z are formed projecting from a back side 68. The partially hollow rods can be fully hollow or partially hollow.

In this embodiment, the animal type aquatic fishing lure can have from 40 to 200 partially hollow rods formed projecting from the back side.

The animal type aquatic fishing lure can have a plurality of air trapping and releasing cavities 26a to 26s formed in the stomach side of the body. In this embodiment legs 61a and 61b are also shown.

FIG. 3C is top perspective view of the animal type aquatic fishing lure.

The back side 68 can have a plurality of partially hollow rods 31a-31z, protruding from the back side and each hollow rod can have an air trapping and releasing cavity 27. In this embodiment, the air trapping and releasing cavities are formed in the partially hollow rods, and not in the body.

In this embodiment, each rod can have a rod length of 0.150 inches. Each rod can have a diameter of 0.094 inches.

In this embodiment, the air trapping and releasing cavity in the rods can be 0.080 inches in diameter and have a depth of 0.01 inches to 0.05 inches.

The legs 61a, 61b, 61c and 61d are also shown.

While these embodiments have been described with emphasis on the embodiments, it should be understood that within the scope of the appended claims, the embodiments might be practiced other than as specifically described herein.

What is claimed is:

1. A worm type aquatic fishing lure for use with a fishing rod, a line and a hook, wherein the worm type aquatic fishing lure can be attached via the line to the fishing rod and used in casting, the worm type aquatic fishing lure comprising a soft, elastic material, comprising:
   (i) a body having a body outer surface, a body longitudinal axis and a body diameter;
   (ii) a first end having a first end diameter formed on one end of the body;
   (iii) a second end having a second end diameter formed on the body opposite the first end;
   (iv) a plurality of rods each having a rod length, extending outwardly from the body outer surface, wherein each rod of said plurality of rods has a rod length 10 percent to 100 percent the body diameter, and further wherein the body supports a rod density of 10 rods to 70 rods per inch along the body longitudinal axis;
   (v) a plurality of air trapping and releasing cavities formed in the body along the body longitudinal axis, the plurality of air trapping and releasing cavities both extending from the body outer surface and terminating within the body and not extending within any of the rods;
   (vi) wherein the air trapping and releasing cavities are formed with a density of 1 air trapping and releasing cavity per inch to 10 air trapping and releasing cavities per inch along the body;
   (vii) wherein the air trapping and releasing cavities trap air while the elasticity of the soft elastic material partially close or open the air trapping and releasing cavities, thereby containing air and releasing air; and
   (viii) upon casting the worm type aquatic fishing lure into water, the rods vibrate creating simulated movement while simultaneously air bubbles of air are non-sequentially released from the air trapping and releasing cavities as the worm type aquatic fishing lure sinks or is drawn through the water, creating a visual attraction in the water simultaneously with creating a life-like appearance and life-like vibrations.

2. The worm type aquatic fishing lure of claim 1, wherein the plurality of rods are equidistantly spaced from each other extending from the body outer surface.

3. The worm type aquatic fishing lure of claim 1, wherein the plurality of rods are formed in clusters on the body outer surface, in lines on the body outer surface, or combinations thereof.

4. The worm type aquatic fishing lure of claim 1, wherein the body is cylindrical in shape and the rods are cylindrical in shape.

5. The worm type aquatic fishing lure of claim 1, wherein the rods are partially hollow and contain other air trapping cavities.

6. The worm type aquatic fishing lure of claim 1, wherein the soft elastic material is an elastomeric polymer, a polyvinyl chloride, a blend consisting of polyvinyl chloride polymer and an elastomer, a biodegradable polyester, a biodegradable plastic material, or combinations thereof.

7. The worm type aquatic fishing lure of claim 1, wherein the soft elastic material is a blend of elastomer and clear polypropylene, a polyethylene, a urethane, combinations thereof, and capable of creating movement when pulled through water.

8. The worm type aquatic fishing lure of claim 1, wherein the worm type aquatic fishing lure is coated or injected with a member of the group: a flavor, a scent, and combinations thereof.

9. The worm type aquatic fishing lure of claim 1, wherein the soft elastic material further comprises a member of the group: glitter, pigment, and combinations thereof.

10. The worm type aquatic fishing lure of claim 1, wherein each of the plurality of rods has a diameter from 0.070 inch to 0.150 inch.

11. The worm type aquatic fishing lure of claim 1, wherein the first end of the body is hollow and the second end of the body is hollow, or the first end of the body is solid and the second end of the body is solid, or the first end of the body is hollow and the second end of the body is solid, or the first end of the body is solid and the second end of the body is hollow.

* * * * *